US011746852B2

(12) United States Patent
Wetzel et al.

(10) Patent No.: US 11,746,852 B2
(45) Date of Patent: Sep. 5, 2023

(54) DRIVE ASSEMBLY FOR A TWO-WHEELED VEHICLE

(71) Applicants: BAYERISCHE MOTOREN WERKE AKTIENGESELLSCHAFT, Munich (DE); Fraunhofer-Gesellschaft zur Foerderung der Angewandten Forschung E.V., Munich (DE)

(72) Inventors: Franz-Josef Wetzel, Gernlinden (DE); Sascha Groetzki, Augsburg (DE); Lionel Mathern, Dachau (DE); Volker Weihnacht, Dresden (DE); Andreas Leson, Dresden (DE)

(73) Assignees: BAYERISCHE MOTOREN WERKE AKTIENGESELLSCHAFT, Munich (DE); FRAUNHOFER-GESELLSCHAFT ZUR FOERDERONG DER ANGEWANDTEN FORSCHUNG E.V, Munich (DE)

( * ) Notice: Subject to any disclaimer, the term of this patent is extended or adjusted under 35 U.S.C. 154(b) by 875 days.

(21) Appl. No.: 16/639,177

(22) PCT Filed: Nov. 5, 2018

(86) PCT No.: PCT/EP2018/080163
§ 371 (c)(1),
(2) Date: Feb. 14, 2020

(87) PCT Pub. No.: WO2019/091913
PCT Pub. Date: May 16, 2019

(65) Prior Publication Data
US 2020/0232541 A1    Jul. 23, 2020

(30) Foreign Application Priority Data
Nov. 13, 2017   (DE) ...................... 10 2017 220 152.5

(51) Int. Cl.
| F16G 13/06 | (2006.01) |
| B62M 9/00 | (2006.01) |
| C10M 107/38 | (2006.01) |
| F16H 7/06 | (2006.01) |
| C10N 40/04 | (2006.01) |
| C10N 50/08 | (2006.01) |

(52) U.S. Cl.
CPC ............... *F16G 13/06* (2013.01); *B62M 9/00* (2013.01); *C10M 107/38* (2013.01); *F16H 7/06* (2013.01); *C10M 2213/0623* (2013.01); *C10N 2040/04* (2013.01); *C10N 2050/08* (2013.01)

(58) Field of Classification Search
CPC ....... F16G 13/06; B62M 9/00; C10M 107/38; C10M 2213/0623; F16H 7/06; C10N 2040/04; C10N 2050/08; B21L 9/02
USPC .......................................... 474/148
See application file for complete search history.

(56) References Cited

U.S. PATENT DOCUMENTS

| 2015/0051035 A1* | 2/2015 | Wilbur ................... F16G 13/06 474/231 |
| 2016/0153083 A1* | 6/2016 | Leson ..................... H01J 37/34 204/192.15 |

FOREIGN PATENT DOCUMENTS

| DE | 102006024433 | 11/2007 |
| DE | 102006052869 | 5/2008 |
| DE | 60317026 | 8/2008 |
| DE | 102008022039 | 11/2009 |
| DE | 102015212368 | 1/2017 |
| JP | 09-503193 | 3/1997 |
| JP | 2006133754 | 10/2005 |
| JP | 2006-029462 | 2/2006 |
| JP | 2010-126419 | 6/2010 |
| JP | 2011-064218 | 3/2011 |
| JP | 2015-232352 | 12/2015 |
| JP | 2017-043837 | 3/2017 |
| WO | WO 2007/134651 | 11/2007 |

OTHER PUBLICATIONS

Japanese Office Action (translated and untranslated).
International Search Report.
German Office Action.
Klaus-Peter Mueller. Lehrbuch Oberflachentechnik. 1996 (abstract).

* cited by examiner

Primary Examiner — Prem C Singh
Assistant Examiner — Francis C Campanell
(74) Attorney, Agent, or Firm — Jacobson Holman PLLC

(57) ABSTRACT

A drive assembly for a two-wheeled vehicle, wherein a closed chain is guided around a drive pinion and a sprocket for output. The chain is formed by pins, on each a bush rotatable about the center longitudinal axis of the pin, a roller provided on each bushing, for rotation around the bushing and has play, and the pins being connected to each other at two opposite ends by means of plates. The outer surface of the bushings and the rollers is coated with pure ta-C, having no further chemical elements except for unavoidable trace elements resulting from production in a PVD method. An $R_a$ roughness between 0.03 μm and 0.2 μm and/or an $R_z$ roughness between 0.3 μm and 2 μm is adhered to the surface of the coatings. The surfaces of the pinion and the sprocket in contact with the rollers do not have a coating of diamond-like carbon.

9 Claims, No Drawings

DRIVE ASSEMBLY FOR A TWO-WHEELED VEHICLE

BACKGROUND OF THE INVENTION

The invention relates to a drive assembly for a two-wheeled vehicle, in particular a high-performance motorbike, in which a closed chain is guided around a drive pinion and a sprocket for the output and the chain is formed by pins, on each of which a bushing rotatable about the center longitudinal axis of the pin in question is arranged and a roller is provided on each bushing, which roller is arranged for rotation about the bushing and has play, and the pins are connected to each other at two opposite end faces by means of plates.

The pins, bushings, rollers and plates can be produced in conventional form from steel as the base material.

Chains with which two-wheeled vehicles are driven usually require regular maintenance and care, which in particular concerns cleaning, lubrication and tensioning of the chain. In the case of high-performance two-wheeled vehicles in particular, lubrication of the chain is necessary at short intervals—that is to say at intervals of only several hundred kilometers—in order to achieve a sufficiently long service life. Lubricant for lubrication must thereby be introduced in a complex operation. in the private sphere, this generally necessitates a suitable workshop—or at least a yard area and optionally a visit to a workshop. This also applies to tensioning of the chain. This is a burden for a user of a two-wheeled vehicle, because it is associated with a loss of free time, additional costs, dirty hands and dirtying of the two-wheeled vehicle.

For shorter intervals (300-600 km), lubrication by means of sprays is suggested and required by the manufacturers. The effectiveness of such lubrication is limited in terms of time, and the vehicle becomes dirty as a result of the lubricant that is sprayed on, which is flung off under centrifugal force, which has a negative effect on the overall esthetic impression and/or necessitates frequent cleaning procedures.

The effectiveness of such lubricants is impaired by moisture and dirt. Road dirt adhering to the lubricant in particular plays a particular role in terms of increased wear.

It is therefore known from DE 10 2006 024 433 A1 to apply wear-reducing hard layers to parts of a chain. Mention is also made inter alia of diamond-like carbon in the form of ta-C. ta-C is known to have a very high hardness, which normally has an adverse effect in the case of friction partners which are subjected to friction. Taking this into account, it was proposed correspondingly to coat the surfaces of both friction partners with diamond-like carbon. In the case of the two-wheeled vehicles in question, it would be necessary to coat the surfaces of the pinion and sprocket that are subjected to friction, which is very time-consuming and cost-intensive because of their outer contours.

SUMMARY OF THE INVENTION

Accordingly, the object of the invention is to provide possibilities for reducing rubbing wear in a drive assembly having a chain, a pinion and a sprocket, which lead to a considerably reduced outlay in terms of care and maintenance and optionally also reduce the frictional resistance.

This object is achieved according to the invention by a drive assembly which has the features seen in the claims along with advantageous embodiments and further developments of the invention.

In the drive assembly for a two-wheeled vehicle according to the invention, a closed chain is guided around a drive pinion and a sprocket for the output. The chain is formed by pins, bushings, rollers and plates. On each of the pins there is arranged a bushing which is rotatable about the center longitudinal axis of the pin in question. A roller is pushed onto each bushing, which roller is arranged for rotation around the bushing and has play. The pins are connected to each other at two opposite end faces by means of plates. The outer surface of each of the bushings and of each of the rollers is coated with a coating of pure ta-C. Apart from carbon there are no further chemical elements in the coatings except for the trace elements which are unavoidable in a PVD method, by means of which the coatings have been formed, due to the production process.

An $R_a$ roughness of between 0.03 µm and 0.2 µm and/or an $R_z$ roughness of between 0.3 µm and 2 µm is to be maintained at the surface of the coatings. In the drive assembly according to the invention, the surfaces of the pinion and of the sprocket that are in contact with the rollers of the chain do not have a coating of diamond-like carbon.

The bushings and rollers are thus hollow-cylindrical in form and, with their inside or outside diameters, also taking into account the outside diameters of the pins, are in such a hollow-cylindrical form that there is a clearance fit suitable for rotation.

It has been found, surprisingly, that, solely by the combination of the pure ta-C coatings on the outer lateral surfaces of bushings and rollers in combination with the required surface quality, the frictional properties can be so advantageously influenced that further additional measures can be dispensed with. Merely a durably acting lubrication, which will be discussed again hereinbelow, can thereby have a positive effect with low additional outlay.

Advantageously, an $R_a$ roughness of between 0.05 µm and 0.15 µm and/or an $R_z$ roughness of between 0.5 µm and 1.5 µm is to be maintained at the surface of the coatings.

The ta-C coatings are to have a layer thickness with a closed surface, which ensures a closed layer even after smoothing of the surfaces of the ta-C coatings has subsequently been carried out.

The layer thickness of the ta-C coatings on the outer surface of bushings is to be greater than that on the outer surfaces of rollers, preferably at least twice as great.

The ta-C coatings can be applied to a bonding or intermediate layer which has been formed on the surfaces of the bushings and rollers that are to be provided with ta-C coatings before the ta-C coatings are formed.

The ta-C coatings are to be formed by means of a PVD method. Such methods have proved successful because of the relatively high and uniform deposition rates and the avoidance of hydrogen contained in ta-C layers. Particularly suitable for the formation of the ta-C coatings is the PVD method known as the laser arc method, in which there is used an electric arc operated in pulse mode and ignited by a laser jet operated in pulse mode on a carbon target ignited electric arc.

In one embodiment, a gasket can be arranged between the two face ends of the bushings and the plates engaged on the pins, which gasket is pushed onto the respective pin. The gaskets are to be provided with a friction-reducing external coating or be formed of a friction-reducing material.

By means of the gaskets it is possible to obtain an almost completely closed space between the outer lateral surfaces of the bushings and the inner wall of the rollers, the dimensioning of which space is influenced by the play of that pairing.

A friction-reducing coating or a friction-reducing material can in particular be PTFE.

The friction-reducing action has an effect on the possible reduction of friction losses advantageously on the efficiency during operation of the two-wheeled vehicle in question. In addition, wear is reduced, so that the sealing action is prolonged, the loss of lubricant and wear at the gaskets, plates and bushings can be reduced.

Advantageously, a lubricant can be contained between the outer surfaces of the pins, the inner surfaces of the bushings and the gaskets. The lubricant in question and the amount of lubricant contained between the bushing and the roller can be so chosen that sufficient lubrication can be ensured over the entire length of an inspection interval specified by the manufacturer of the two-wheeled vehicle. Corrosion inter alia of the inside of the rollers can also be counteracted by means of the lubricant.

It is obvious that the volume for receiving lubricant molecules between the outer lateral surface of a pin and the inner surface of a hollow-cylindrical bushing, which is limited at the outer end faces by gaskets, is relatively small, so that lubricant can be introduced there and used for lubrication and for protection against corrosion only in a correspondingly small volume. Nevertheless, the lubricant volume which can thus be used, in conjunction with the smoothed surfaces of the ta-C coatings, is sufficient to achieve a sufficiently long maintenance-free operating period, without additional measures between the inspection intervals which are in any case required or other maintenance or repair work, such as, for example, an oil or wheel change. Introduction of lubricant with the chain assembled is possible, if at all, only with difficulty and to a limited extent. In general, a first initial lubrication on completion of a drive assembly according to the invention lasts until a first required inspection or other maintenance of the two-wheeled vehicle in a specialist workshop, when a bushing/roller/gasket/plate lubricant suitable for drive chains can be applied by the qualified personnel and the slot thereof can thereby be filled up. When the invention is used, the driver of the two-wheeled vehicle no longer has to carry out the hitherto customary re-lubrication operations at regular short intervals in order to achieve a sufficiently long overall service life, in particular of the chain of a drive assembly according to the invention.

The intervals at which re-lubrication or other maintenance on the drive assembly is required can be increased to 10,000 km or more, without additional measures having to be carried out in the meantime.

In an advantageous embodiment, the surfaces of the plates can be provided with a coating that protects against corrosion and wear, or the material of the plates can be modified in that manner in the region close to the surface. However, a coating is not to be formed with diamond-like carbon.

The surface of the coating on plates that protects against corrosion and wear can be modified with nitrogen, boron or phosphorus, or the coating that protects against corrosion and wear can be formed by a nitride and/or phosphate compound, in particular by nickel phosphate.

A modified surface can be formed, for example, with TiN or AlN. The nitride in question can take place by a surface-modifying process in which nitriding can be achieved in a manner known per se.

A coated or modified surface of the plates can also improve the esthetic impression. This can be achieved not only by the omission of the generally dirty black lubricant film which is present in the case of conventional chain drives on the surface of the chain links, but also by color effects which can be achieved, for example by silver- or gold-colored gloss. It is, however, optionally also possible to adapt the color to the color of the casing or other add-on parts of a two-wheeled vehicle that are visible from outside.

This visually visible effect can be maintained in the long term and is also not substantially detrimentally changed during operation.

A nickel phosphate coating in particular can effectively protect the plates against wear and corrosion, improve the chemical resistance, the dimensional accuracy and the anti-friction behavior and increase the electrical conductivity and the hardness. The coating can be formed on the surface of plates true to the original contours and uniformly. Geometrically complex regions of the plates, in particular at edges and impressions, accessible cavities or bores, can be coated uniformly.

The wear and corrosion resistance of nickel phosphate coatings can be influenced by the phosphorus content. This can be influenced by the composition of the electrolyte in the case of electroless deposition. Layer thicknesses in the range from 2 µm to 50 µm are to be maintained.

There are suitable as base materials for nickel phosphatable plates all low-alloy ferritic steels or optionally also sintered metals.

The required surface quality of the coatings consisting of ta-C can be achieved by mechanical post-processing. For this purpose, leveling of the surface can be achieved by means of iron-containing elements, which along the surface in question under the influence of specifiable compressive forces against the ta-C layer surface. The iron-containing elements can be, for example, brush-like and, on rotation, the end faces of the elements level the surface of the ta-C coating until the required surface quality has been achieved.

It is also possible to carry out a surface treatment of the ta-C coatings in which two friction partners which are provided on surfaces with a diamond-like coating are used. At least one of the friction partners is a bushing or roller. A concrete procedure in this respect can be found in the following description of an exemplary embodiment.

With the use of the invention, the efficiency of the drive of a two-wheeled vehicle can be improved and thus fuel consumption and $CO_2$ emission can be reduced. The service life of wearing parts can be increased and the consumption of lubricant can be reduced, which leads to a fall in operating costs. In addition, the user in question is relieved of the burden of care and maintenance, which increases his quality of life and the amount of free time he has available.

These advantages can be achieved with a drive assembly according to the invention in which only the specific surfaces of the bushings and rollers of a chain have been coated with ta-C and the ta-C coatings have been smoothed on their surfaces.

DETAILED DESCRIPTION OF THE INVENTION

The invention will be described in greater detail hereinbelow.

The chain belonging to the drive assembly is substantially a conventional chain, as is usual for use on two-wheeled vehicles. This applies both to the form and dimensioning of the individual elements forming the chain, and to the materials of which those elements are formed. Thus, pins, bushings, rollers and plates are usually made of a steel. The surfaces of the pins, bushings and rollers have been mechanically processed and thereby smoothed.

In the invention, conventional pinions and sprockets are also used for the input and output.

The bushings and rollers which can be used in the invention form a type of semi-finished product and are supplied as bulk goods in the roughly cleaned and slightly greased state. Prior to the formation of the ta-C coatings, the working operations of degreasing, ultrasound-assisted wet cleaning in an alkaline bath and rinsing in deionized water, immediately followed by drying in a hot-air oven, are carried out.

For incorporation into a PVD coating installation, the rollers and bushings are received on rods, wherein the number of rollers or bushings is governed by the maximum coating height of the installation. The rods with the rollers or bushings stacked thereon are installed in a position on a holder of a rotating cage of the coating installation, so that they are in triple rotation during coating.

Coating in the PVD installation begins, after pumping down to a sufficiently low starting pressure in the high vacuum range, with plasma etching, in which surface contamination, covering and oxide layers on the surfaces of the bushings and rollers are removed with argon ions. This process is followed by the deposition of a metallic adhesion promoter layer, generally chromium. This layer is applied by means of a vacuum arc or sputtering process. The layer thickness is to be approximately 0.2 μm. Finally, in the next step, a ta-C coating is applied by means of vacuum arc vaporization of graphite. The vacuum arc vaporization technique can be a simple electric direct current arc technique or a pulsed electric arc technique. The latter can preferably be used via a laser-ignited electric arc technique (laser arc method) for forming the ta-C coatings on the outer surfaces of the bushings and rollers.

The layer thickness of the ta-C coatings is to be maintained between 0.5 μm and 10 μm, preferably 2.5 μm on the rollers and 5 μm on the bushings. The coatings are in each case homogeneous ta-C layers which are to have a hardness of preferably 50 GPa-70 GPa.

After coating, mechanical smoothing of the parts coated with ta-C is preferably carried out in order to reduce the roughness of the ta-C layer resulting from the process. Tumble smoothing can preferably be carried out for this purpose.

The bushings and/or rollers provided with a ta-C coating are thereby introduced, alone or together with tools provided with corresponding ta-C layers, into a barrel which is preferably configured with carriers on a barrel wall. The closed barrel is then rotated about its horizontal longitudinal axis. A temperature of 20° C. is thereby maintained, and a pressure of 0.5 N/mm² is used.

The rotation of the barrel results in a tumbling movement of the amount of bushings and/or rollers in the form of loose bulk products, and optionally of the tools, in the barrel and thus in relative movements of the bushings and/or rollers with the tools optionally contained in the barrel at the surfaces provided with the ta-C coating. This leads to a mutual removal of roughness peaks on the surfaces of the ta-C coatings. After a sufficiently long time of about 15 minutes, the rotation is ended and the barrel is opened. The provided on the with the ta-C coatings and optionally the tools can then be removed from the barrel. The outer surfaces of the bushings and rollers so processed have a significantly reduced roughness $R_z$ of 0.5 μm. It was possible to achieve an $R_a$ roughness of 0.05 μm. Any wear debris that has formed can be removed by rinsing with a suitable solution, for example an aqueous medium as cleaning medium. This rinsing can be carried out both during the surface processing in the barrel and as a separate process step after completion of the surface processing and removal of the bushings and/or rollers from the barrel.

Smoothing can also be carried out by means of an oscillating linear movement or a random movement without a given pattern.

The ta-C coatings can have depressions or elevations which are formed by hard carbon particles which are formed during the formation of the ta-C coatings by means of the vacuum arc method. The hard carbon particles can be broken out of the ta-C coating during smoothing, and a depression remains there as a defect. The depression(s) have on average a width of 1 μm.

The method of surface smoothing can be carried out without the addition of auxiliary substances, but an iron powder may also be introduced into the drum and/or applied to an outer surface of the ta-C coatings in order to assist with smoothing by a chemical-catalytic action of the iron.

A nickel phosphate layer on surfaces of plates can be formed as described below:

In the method for producing a metal coating by electroless deposition, the plates of a chain that are to be coated are immersed in an aqueous electrolyte which contains nickel cations and phosphinate ions. The proportion of nickel cations in the electrolyte can be kept between 79% by mass and 97% by mass and the proportion of phosphinate ions in the electrolyte can be kept between 2% by mass and 15% by mass. Small proportions of antimony and bismuth ions may also be present.

The nickel ions are thereby reduced to pure nickel. With hypophosphite ions, which are reduced in the process to orthophosphate, a coating formed by a nickel-phosphorus alloy can form on the surface of the plates. The production of such coatings is known per se and is offered commercially as durnicoating under the name "Durni-Coat" by AHC-Oberflächentechnik GmbH & Co. OHG, based in Kerpen DE.

The invention claimed is:

1. A drive assembly for a two-wheeled vehicle, in which a closed chain is guided around a drive pinion and a sprocket for the output and the chain is formed by pins, on each of which there is arranged a bushing which is rotatable about the center longitudinal axis of the pin, and a roller is provided on each bushing, which roller is arranged for rotation around the bushing, the pins are connected to each other at two opposite end faces by means of plates; wherein the outer surface of each of the bushings and of each of the rollers is coated with a coating of essentially pure ta-C and;
    an Ra roughness of between 0.03 μm and 0.2 μm and/or an $R_z$ roughness of between 0.3 μm and 2 μm is maintained at the surface of the coatings; the surfaces of the pinion and of the sprocket that are in contact with the rollers of the chain do not have a coating of diamond-like carbon; and the closed chain is not used in internal combustion engines.

2. The drive assembly as claimed in claim 1, wherein an $R_a$ roughness of between 0.05 μm and 0.15 μm and/or an $R_z$ roughness of between 0.5 μm and 1.5 μm is maintained at the surface of the coatings.

3. The drive assembly as claimed in claim 1, wherein the layer thickness of the ta-C coating on the outer surfaces of the bushings is greater than that on the outer surfaces of the rollers.

4. The drive assembly as claimed in claim 1, wherein the layer thickness of the ta-C coating on the outer surfaces of bushings is at least twice as great as that on the outer surfaces of the rollers.

5. The drive assembly as claimed in claim 1, wherein a gasket is arranged between the face ends of the bushings and the plates engaged on the pins respectively, which gasket is pushed onto the respective pin, and the gaskets are provided with a friction-reducing external coating or are formed of a friction-reducing material.

6. The drive assembly as claimed in claim 5, wherein a friction-reducing coating or a friction-reducing material is PTFE.

7. The drive assembly as claimed in claim 1, wherein in that a solid lubricant is contained between the outer surfaces of the pins, the inner surfaces of the bushings and the gaskets.

8. The drive assembly as claimed in claim 1, wherein the surfaces of the plates are provided with a coating that protects against corrosion and wear, or the material of the plates is modified in that manner in the region close to the surface, wherein a coating is not formed with diamond-like carbon.

9. The drive assembly as claimed in claim 1, wherein a surface of the coating that protects against corrosion and wear is modified with nitrogen, boron or phosphorus.

\* \* \* \* \*